I. A. Benedict,
Shovel Plow.
No. 109,999. Patented Dec. 13, 1870.
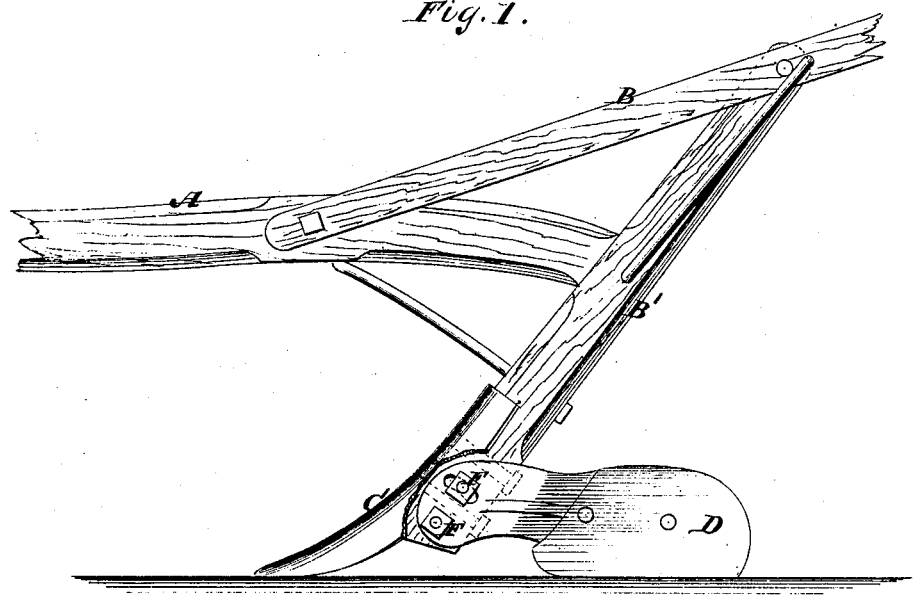
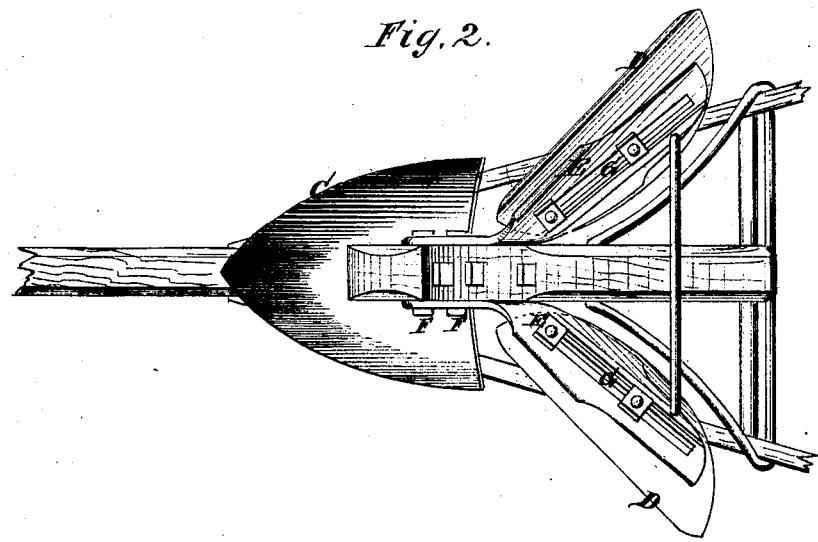
Witnesses:
E. Wolff
L. S. Mabee
Inventor:
I. A. Benedict
per Munn & Co
Attorneys.

UNITED STATES PATENT OFFICE.

ISAAC A. BENEDICT, OF WEST SPRINGFIELD, PENNSYLVANIA.

IMPROVEMENT IN SHOVEL-PLOWS.

Specification forming part of Letters Patent No. 109,999, dated December 13, 1870.

*To all whom it may concern:*

Be it known that I, ISAAC A. BENEDICT, of West Springfield, in the county of Erie and State of Pennsylvania, have invented a new and useful Improvement in Shovel-Plows; and I do hereby declare that the following is a full, clear, and exact description thereof, which will enable others skilled in the art to make and use the same, reference being had to the accompanying drawings, forming part of this specification.

This invention relates to a new and useful improvement in winged shovel-plows; and it consists in attaching the wings to adjustable arms and making the wings adjustable on the arms, as hereinafter more fully described.

In the accompanying drawings, Figure 1 represents a side elevation of the plow with a portion of the shovel or blade broken away to show the slot in the arm by means of which the pitch of the wing is varied. Fig. 2 represents the plow turned bottom side up to show the slot-holes in the arms by means of which the wings are extended or contracted.

Similar letters of reference indicate corresponding parts.

A is the beam, B the handles, B' the standard, and C the shovel or blade, of the ordinary shovel-plow.

D D are wings connected with the standard B', and which wings are an improvement on shovel-plows for which Letters Patent of the United States were granted me, dated June 15, 1869.

E E are the arms, to which the wings are attached in my present invention, which arms constitute my present improvement. These arms are attached to the lower end of the standard B' by the bolts F F. The upper bolt-holes through the arms are slots, as seen in the drawings, so that the wings attached to the arms may be raised or lowered, as may be desired. The lower bolt-holes in the arms may be slots for producing the same effect. The arms extend back so as to support the wings, and are slotted longitudinally, as seen at G G, so that the bolts H H, which fasten the wings, will slide in the slots and allow them to be extended or contracted. The arms are so arranged that the wings stand at an angle of about forty-five degrees (more or less) with the standard.

I is a stretcher between the arms. By adjusting the arms on the standard the pitch of the wings is varied, and by adjusting the wings on the arms the width of their cut may be made broad or narrow, as may be desired.

Having thus described my invention, I claim as new and desire to secure by Letters Patent—

The combination, with a pair of wings, D D, of arms E E, pivoted to the foot of brace B', turning upwardly in an arc-slot upon the top bolts, F F, and slotted at G G to allow the bolts H H to slide thereon to lift, expand, and contract said wings, all as described.

ISAAC A. BENEDICT.

Witnesses:
I. NEWTON MILLER,
F. D. MILLER.